United States Patent
Fukuhara et al.

(10) Patent No.: US 7,463,780 B2
(45) Date of Patent: Dec. 9, 2008

(54) IMAGE ENCODER, IMAGE ENCODING METHOD, IMAGE DECODER, AND IMAGE DECODING METHOD

(75) Inventors: Takahiro Fukuhara, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 11/059,478

(22) Filed: Feb. 16, 2005

(65) Prior Publication Data

US 2005/0196058 A1  Sep. 8, 2005

(30) Foreign Application Priority Data

Feb. 23, 2004  (JP)  ............................ P2004-046713

(51) Int. Cl.
G06K 9/36 (2006.01)
G06K 9/46 (2006.01)
H04N 1/41 (2006.01)
H04N 7/12 (2006.01)
H04N 11/02 (2006.01)
H04N 11/04 (2006.01)

(52) U.S. Cl. ........................ 382/240; 382/233; 382/248; 348/403.1; 358/426.14

(58) Field of Classification Search ................. 382/166, 382/233, 239, 240, 248–251; 348/395.1, 348/400.1, 403.1; 375/240.18–240.2; 358/426.14
See application file for complete search history.

(56) References Cited

U.S. PATENT DOCUMENTS

| | | | |
|---|---|---|---|
| 5,930,398 A | * | 7/1999 | Watney ...................... 382/239 |
| 6,249,614 B1 | * | 6/2001 | Kolesnik et al. ............ 382/239 |
| 7,200,277 B2 | * | 4/2007 | Joshi et al. ................... 382/248 |
| 2002/0057736 A1 | * | 5/2002 | Fuji et al. .................... 375/240 |
| 2003/0088598 A1 | * | 5/2003 | Nakayama ................. 708/300 |
| 2003/0115050 A1 | * | 6/2003 | Chen et al. ................... 704/230 |
| 2004/0165779 A1 | * | 8/2004 | Guillou et al. .............. 382/232 |

FOREIGN PATENT DOCUMENTS

EP  1 158 773 A2  11/2001

OTHER PUBLICATIONS

Michael W. Marcellin, et al., An Overview of Quantization in JPEG 2000, Signal Processing: Image Communication 17, 2002, pp. 73-84.
Martin Boliek, Coding of Still Pictures, JPEG 2000 Part I Final Committee Draft Version 1.0, Mar. 16, 2000, pp. 1-190.
Michael J. Gormish, et al., JPEG 2000: Overview, Architecture, and Applications, 2000.

* cited by examiner

*Primary Examiner*—Yubin Hung
(74) *Attorney, Agent, or Firm*—Sonnenschein Nath & Rosenthal LLP

(57) ABSTRACT

In an image encoder, a first quantization section which is selected when normal image quality is required performs quantization by dividing a wavelet transformation coefficient by a quantization step size and by thereafter rounding down a fraction thereof. On the other side, a second quantization section which is selected when high image quality is required performs quantization by dividing a wavelet transformation coeffient by a quantization step size, by adding 0.5 to the dividing result, and by thereafter rounding down a fraction thereof. Therefore, the width of a dead zone where coefficients are quantized to a value of 0 is narrower than that in the first quantization section, and higher image quality is obtained accordingly.

3 Claims, 14 Drawing Sheets

| Code string MSB    LSB | Quantization style | SPqcd or SPqcc size (bits) | SPqcd or SPqcc content |
|---|---|---|---|
| xxx0 0000 | not quantized | 8 | Table A-29 |
| xxx0 0001 | Scalar quantization (LL sub-bands only) | 16 | Table A-30 |
| xxx0 0010 | Scalar quantization (All sub-bands) | 16 | Table A-30 |
| 000x xxxxx- 111x xxxx | Guard bit number (guard bit: 0-7) | | |
| | Others reserved | | |

FIG. 10

| Code string MSB　　LSB | Quantization style | SPqcd or SPqcc size (bits) | SPqcd or SPqcc content |
|---|---|---|---|
| xxx0 0000 | not quantized | 8 | Table A-29 |
| xxx0 0001 | Scalar quantization (LL sub-bands only) | 16 | Table A-30 |
| xxx0 0010 | Scalar quantization (All sub-bands) | 16 | Table A-30 |
| 000x xxxx– 111x xxxx | Guard bit number (guard bit:0–7) | | |
| xxx0 00xx– xxx1 11xx | Predetermined parameter (0–7) | | |

FIG.11

IMAGE ENCODER, IMAGE ENCODING METHOD, IMAGE DECODER, AND IMAGE DECODING METHOD

BACKGROUND OF THE INVENTION

1. Field of the Invention

The present invention relates to an image encoder and a method thereof in which an input image is compressed and encoded by wavelet transformation, quantization, and entropy encoding to generate an encoded code stream, and an image decoder and a method thereof in which the generated code stream is decoded to reconstruct the input image, like the JPEG 2000 scheme.

This application claims priority of Japanese Patent Application NO. 2004-046713, filed on Feb. 23, 2004, the entirety of which is incorporated by reference herein.

2. Description of Related Art

One of conventional typical image compression schemes is the JPEG (Joint Photographic Experts Group) scheme standardized by the ISO (International Standards Organization). This scheme utilizes discrete cosine transformation (DCT). When a relatively high bit number is assigned, excellent encoded and decoded images are obtained, as is known. However, if the encoding bit number is lowered to a certain degree or much lower, block deformation inherent to the DCT appears so conspicuously that subjective deterioration of image quality becomes conspicuous.

Meanwhile, recent developments have been becoming active about a scheme in which an image is divided into plural bands by a filter combining high-pass and low-pass filters, called a filter bank, and encoding is performed for every band. In those developments, wavelet transformation encoding has been considered as new prevailing technology which will take over the DCT because the wavelet transformation encoding does not have the drawback of block deformation appearing conspicuously at a high compression rate like in the DCT.

The JPEG 2000 scheme has been completely internationally standardized since January 2001, and employs a system which combines the wavelet transformation, quantization and highly efficient entropy encoding (bit modeling and arithmetic encoding in units of bit planes.) Compared with earlier JPEG schemes, the encoding efficiency has been improved actually (see Japanese Patent Application Laid-Open Publication No. 2002-27403.) These international standards define specifications concerning decoders but allows free design concerning encoders.

However, the quantization means in the JPEG 2000 scheme aims primarily at a high compression rate. There hence has been a problem that excellent performance cannot always be achieved in case where a high-quality image is required at a low compression rate.

SUMMARY OF THE INVENTION

The present invention has been proposed in view of current situations as described above, and has an object of providing an image encoder and a method thereof capable of performing a quantization processing corresponding to required image quality, and an image decoder and a method thereof capable of decoding a generated encoded code stream to reconstruct an input image.

To achieve the above object, an image encoder according to the present invention comprises: a filtering means which hierarchically performs a filtering processing on an input image, to generate plural sub-bands; a quantization means which quantizes coefficients in each of the sub-bands after the filtering processing; a code block generation means which divides the sub-bands, to generate code blocks each having a predetermined size; a bit plane generation means which generates bit planes from a most significant bit to a least significant bit, for every one of the code blocks; an encoding means which arithmetically encodes a coding pass generated for every one of the bit planes; and a format means which performs formatting by adding a header to an arithmetic code generated by the encoding means, to generate an encoded code stream, wherein the quantization means varies the width of a dead zone in correspondence with required image quality, the dead zone being a quantization zone where the coefficients are quantized to a value of 0, and the format means sets a predetermined parameter included in the header, the predetermined parameter being to be used when inverse quantization corresponding to the quantization of the quantization means is performed.

To achieve also the above object, an image encoding method according to the present invention comprises: a filtering step of hierarchically performing a filtering processing on an input image, to generate plural sub-bands; a quantization step of quantizing coefficients in each of the sub-bands after the filtering processing; a code block generation step of dividing the sub-bands, to generate code blocks each having a predetermined size; a bit plane generation step of generating bit planes from a most significant bit to a least significant bit, for every one of the code blocks; an encoding step of arithmetically encoding a coding pass generated for every one of the bit planes; and a format step of performing formatting by adding a header to an arithmetic code generated by the encoding step, to generate an encoded code stream, wherein in the quantization step, the width of a dead zone is varied in correspondence with required image quality, the dead zone being a quantization zone where the coefficients are quantized to a value of 0, and in the format step, a predetermined parameter is included in the header, the predetermined parameter being to be used when inverse quantization corresponding to the quantization of the quantization step is performed.

In the image encoder and image encoding method as described above, when quantizing each coefficient in each sub-band after filtering processing, the width of the dead zone is varied in correspondence with image quality required. In addition, the predetermined parameter used to perform inverse quantization corresponding to the quantization is included in the header of the encoded code stream.

To achieve also the above object, an image decoder according to the present invention reconstructs an input image by decoding an encoded code stream which is generated by the above-described image encoding processing, the image decoder comprising: an inverse format means which decomposes the encoded code stream into at least the arithmetic code and the predetermined parameter; a decoding means which decodes the arithmetic code; an encoded-pass decoding means which decodes the encoded pass for every one of the bit planes, to reconstruct the bit planes from the most significant bit to the least significant bit; a code block reconstruction means which reconstructs the code bocks, based on the bit planes from the most significant bit to the least significant bit; a sub-band generation means which collects the code blocks to generate the sub-bands; an inverse quantization means which inversely quantizes a quantization coefficient for every one of the sub-bands, with use of the predetermined parameter; and a filtering means which performs hierarchically a filtering processing on the sub-bands, to reconstruct the input image.

To achieve also the above object, in an image decoding method according to the present invention, an input image is reconstructed by decoding an encoded code stream which is generated by the above-described image encoding processing, the image decoding method comprising: an inverse format step of decomposing the encoded code stream into at least the arithmetic code and the predetermined parameter; a decoding step of decoding the arithmetic code; an encoded-pass decoding step of decoding the encoded pass for every one of the bit planes, to reconstruct the bit planes from the most significant bit to the least significant bit; a code block reconstruction step of reconstructing the code bocks, based on the bit planes from the most significant bit to the least significant bit; a sub-band generation step of collecting the code blocks to generate the sub-bands; an inverse quantization step of inversely quantizing a quantization coefficient for every one of the sub-bands, with use of the predetermined parameter; and a filtering step of performing hierarchically a filtering processing on the sub-bands, to reconstruct the input image.

In the image decoder and image decoding method as described above, the quantization coefficients for every sub-band are inversely quantized with use of the predetermined parameter included in the encoded code stream.

In the image encoder and image encoding method, and the image decoder and image decoding method according to the present invention, when quantizing each coefficient in each sub-band after filtering processing, the width of the dead zone is varied in correspondence with image quality required. In addition, the predetermined parameter used to perform inverse quantization corresponding to the quantization is included in the encoded code stream. Thus, the image quality of a decoded image can be varied. Particularly, when high quality is required, the width of the dead zone is narrowed to eliminate loss of details caused by quantization, and hence, subjective image quality can be improved.

BRIEF DESCRIPTION OF THE DRAWINGS

FIG. 5A shows a quantization coefficient set consisting of total sixteen coefficients, FIG. 5B shows bit planes showing absolute values of coefficients, and FIG. 5C shows a bit plane of a code;

FIG. 10 is a table concerning Sqcd and Sqcc parameters;

FIG. 11 is a table including a value of parameter r added to the table of FIG. 10;

DETAILED DESCRIPTION OF THE PREFERRED EMBODIMENTS

Hereinafter, a specific embodiment to which the present invention is applied will be described in more details with reference to the drawings. In the present embodiment, the present invention is applied to an image encoder and a method thereof in which an input image is compressed and encoded according to the JPEG 2000 scheme, to generate an encoded code stream, and an image decoder and a method thereof in which the encoded code stream generated is decoded to reconstruct an input image.

(1) Structure and Operation of the Image Encoder

Figure 1:
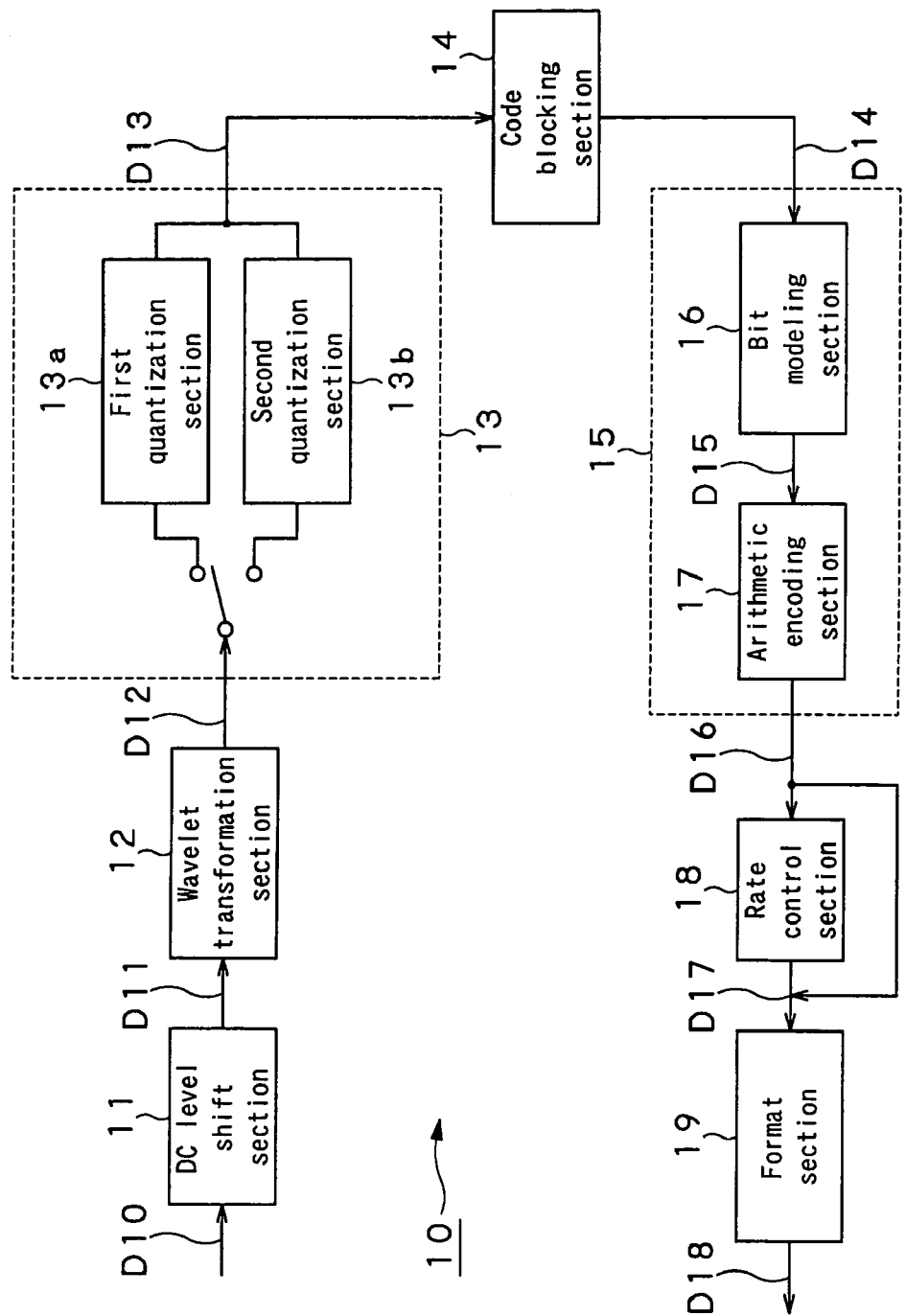
FIG. 1 is a diagram showing a schematic configuration of an image encoder according to an embodiment.

FIG. 1 shows a schematic structure of the image encoder in the present embodiment. As shown in FIG. 1, the image encoder 10 is constituted by a DC level shift section 11, wavelet transformation section 12, quantization section 13, code blocking section 14, bit modeling section 16, arithmetic encoding section 17, rate control section 18, and format section 19. The quantization section 13 includes a first quantization section 13a selected when normal image quality is required, and a second quantization section 13b selected when high image quality is required. The bit modeling section 16 and the arithmetic encoding section 17 constitute together an EBCOT (Embedded Coding with Optimized Truncation) section 15.

The DC level shift section 11 effects level-shifting on an original signal, in order to perform efficiently wavelet transformation in the wavelet transformation section 12 in a rear stage and improve the compression rate. In principle, an RGB signal has a positive value (i.e., an integer without plus or minus symbol), and therefore, level-shifting is executed to reduce the dynamic range of the original signal to half. Then, the compression efficiency can be improved. In contrast, color difference signals such as Cb and Cr of a YCbCr signal have both positive and negative integers. Therefore, level-shifting is not carried out.

The wavelet transformation section 12 is normally realized by a filter bank which includes low-pass and high-pass filters. Since a digital filter has an impulse response having plural tap lengths (filter coefficients), it is necessary to buffer, in advance, a part of an input image that is enough to execute filtering although this is omitted from FIG. 1 to help simple understanding.

The DC level shift section 11 is inputted with an image signal D10 of a least necessary volume for filtering, and executes level-shifting as described above. Further, the wavelet transformation section 12 performs a filtering processing in which wavelet transformation is effected on the image signal D11 after the DC level shifting. This section 12 thus generates a wavelet transformation coefficient set D12, and supplies the generated wavelet transformation coefficient set D12 to the quantization section 13.

Figure 2:
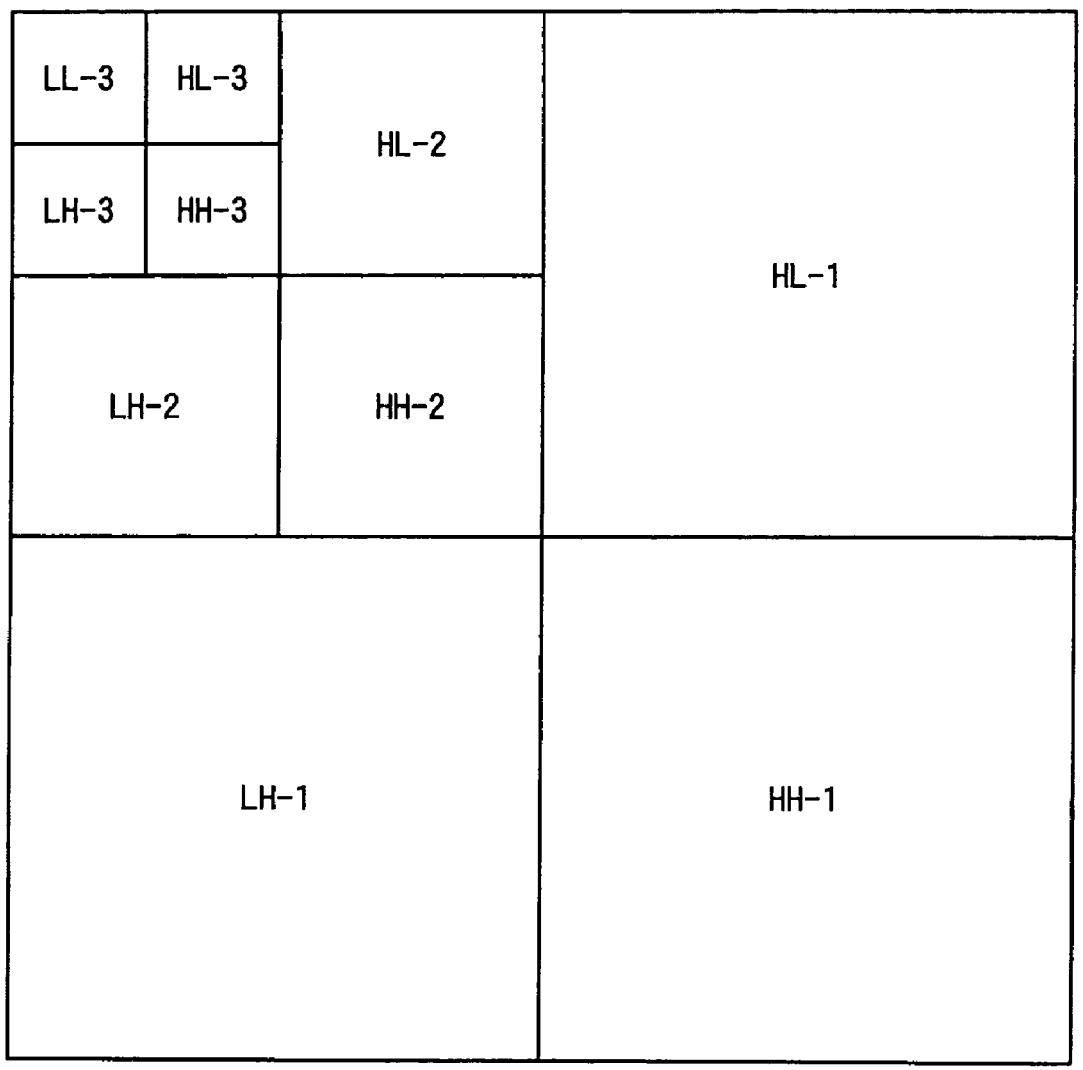
FIG. 2 is a diagram for explaining sub-bands when wavelet transformation is effected three times.
Figure 3B:
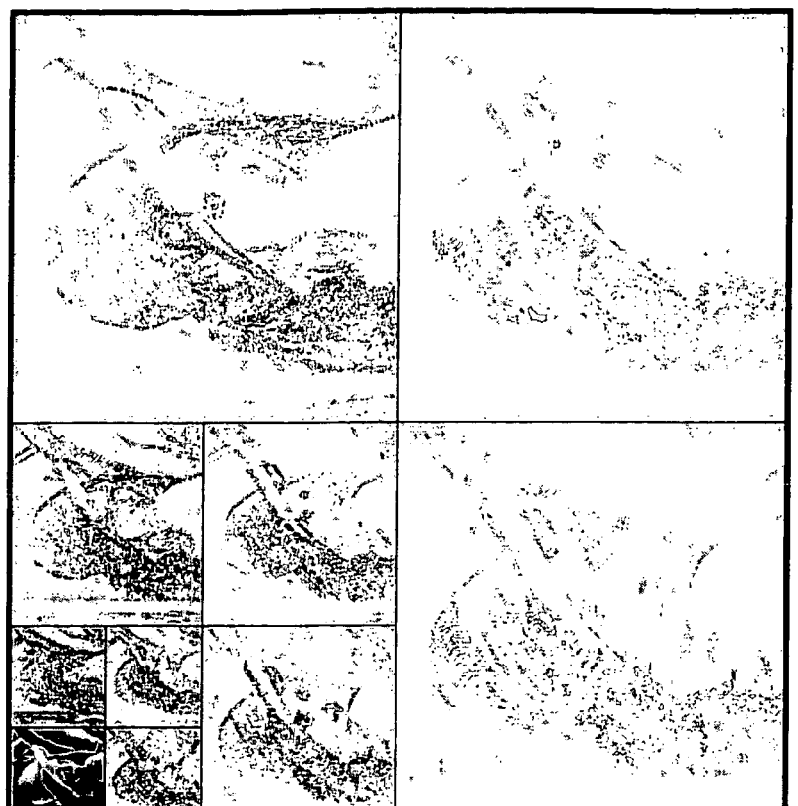
FIGS. 3A and 3B are views for explaining sub-bands when an actual image is subjected to wavelet transformation.
Figure 3A:
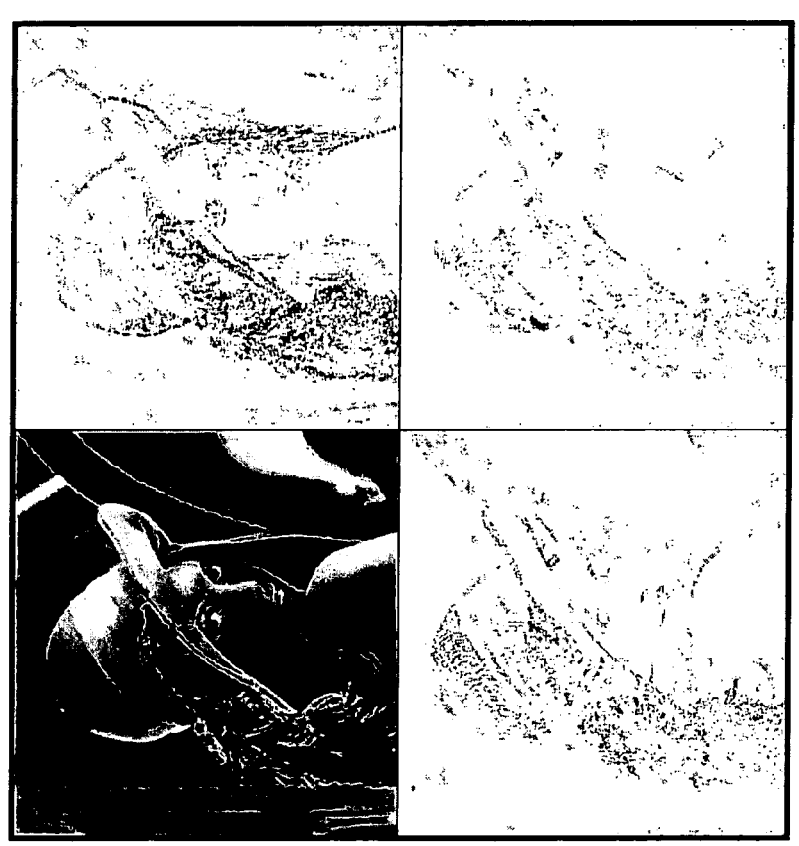

In this wavelet transformation, normally, low-pass components are repeatedly transformed as shown in FIG. 2 because energy of an image concentrates mainly on low-pass components. This can be understood apparently from FIGS. 3A and 3B in which sub-bands are formed as illustrated therein as the division level shifts from the division level 1 in FIG. 3A to the division level 3 shown in FIG. 3B. Meanwhile, the division level of wavelet transformation in FIG. 2 is three, and total ten sub-bands are formed as a result. In FIG. 2, L and H denote respectively low-pass and high-pass bands, and the numeral following each symbol indicates a division level. That is, for example, LH-1 expresses a sub-band which has a low-pass component in the horizontal direction as well as a high-pass component in the vertical direction in the division level 1.

The quantization section 13 performs irreversible compression on the wavelet transformation coefficient set D12 supplied from the wavelet transformation section 12, and supplies a quantization coeffecient set D13 to the code blocking section 14. The quantization means may employ scalar quantization in which the wavelet transformation coefficient set D12 is divided by a quantization step size.

Because of the standard of the JPEG 2000 scheme, compliant use of the scalar quantization is automatically determined when a 9×7 wavelet transformation filter is used in case of performing the irreversible compression. On the other side, when a reversible 5×3 wavelet transformation filter is used, quantization is not executed but code amount control is carried out by the rate control section 18 described later. Thus, the quantization section 13 shown in FIG. 1 operates actually when the irreversible 9×7 wavelet transformation filter is used. The description below, however, will be made on interpretation that scalar quantization is carried out with a quantization step size of 1 when the reversible 5×3 wavelet transformation filter is used. The quantization step size in the present embodiment is defined by both of the quantization step size in the scalar quantization and fractions of bit planes or encoding passes as will be described later.

As described above, the quantization section 13 includes the first quantization section 13a selected when normal image quality is required, and the second quantization section 13b selected when high image quality is required. A quantization processing is peformed corresponding to each of the image qualities. These first and second quantization sections 13a and 13b will be described later in more details concerning their operation.

Figure 4:
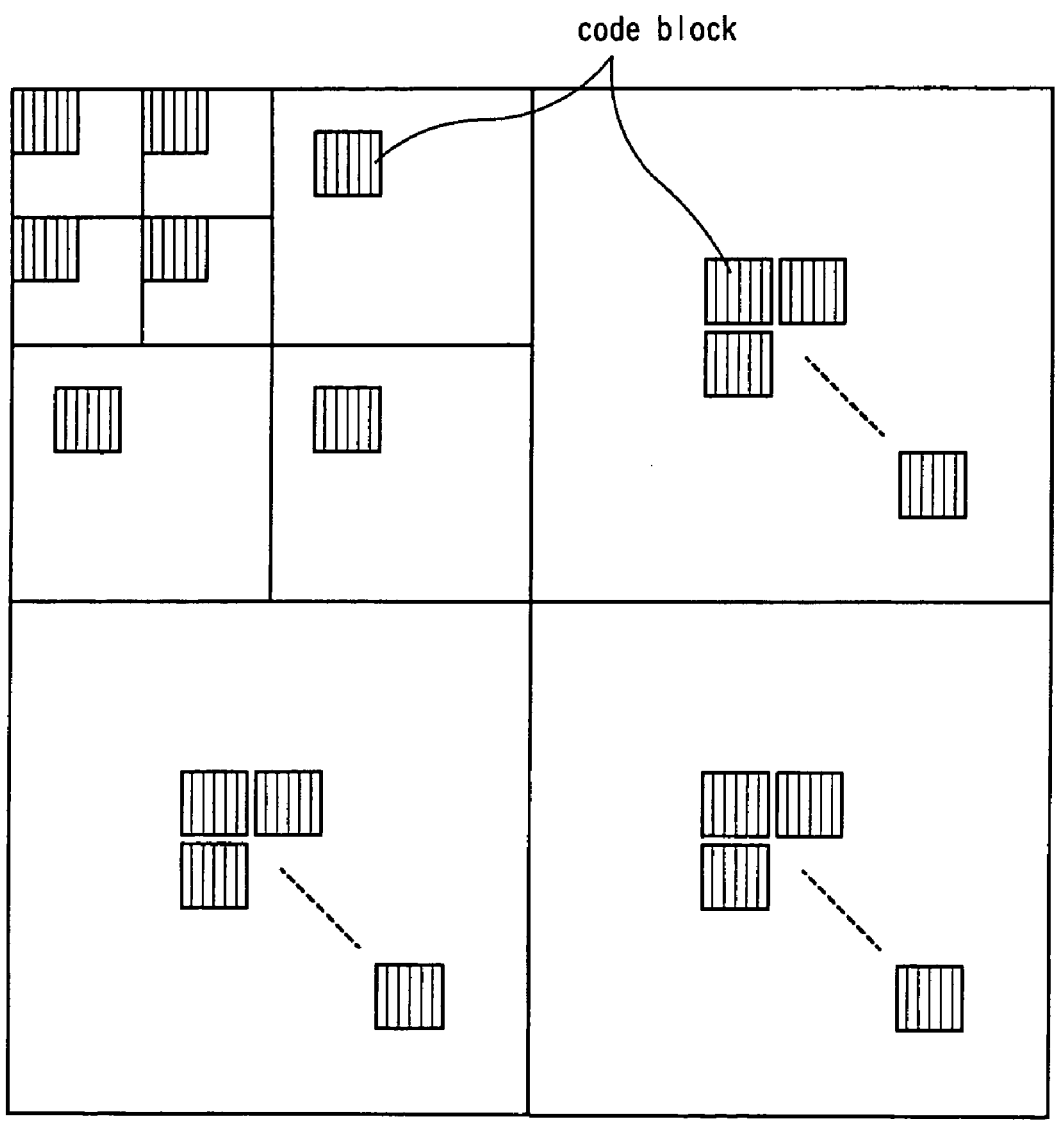
FIG. 4 is a diagram for explaining code blocks and sub-bands.

The code blocking section 14 divides the quantization coefficient set D13 supplied from the quantization section 13, into code blocks which are processing units in entropy encoding and have a predetermined size. FIG. 4 shows the positional relationship between the code blocks in a sub-band. Normally, for example, code blocks each having a size of 64×64 are generated in all sub-bands after the division. Therefore, if a sub-band has a size of 640×320, code blocks of 64×64 are generated in a matrix of ten columns in the horizontal direction and five rows in the vertically direction. Total fifty code blocks are thus generated. The code blocking section 14 supplies the EBCOT section 15 with a quantization coefficient set D14 for every code block. Further, encoding processing in a rear stage is carried out for every code block.

The EBCOT section 15 explodes the quantization coefficient set D14 on bit planes for every code block, and performs bit-modeling and arithmetic encoding in units of bit planes. Details of the EBCOT are described in, for example, a document "ISO/IEC 15444-1, Information technology-JPEG 2000, Part 1: Core coding system" and the like.

Figure 5:
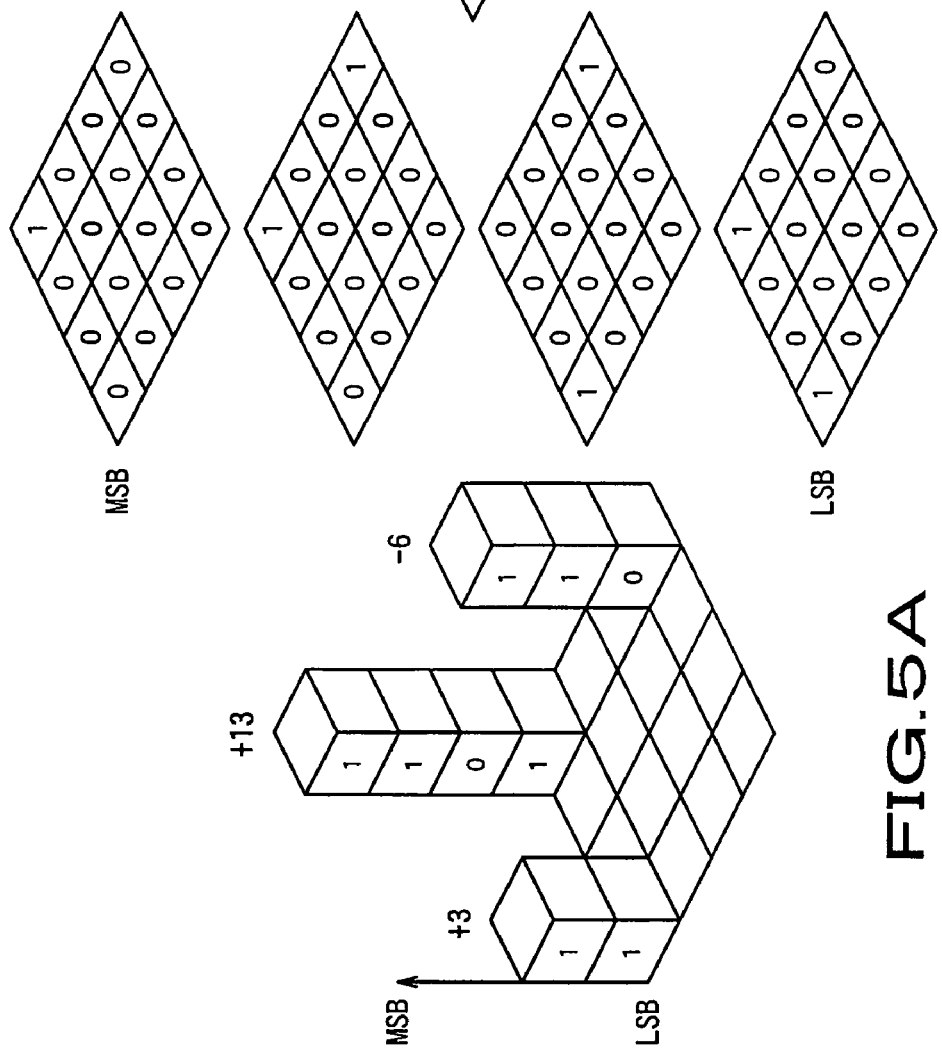
FIGS. 5A to 5C are views for explaining bit planes where

Before making an explanation to the EBCOT, the concept of bit plane will be described first with reference to FIGS. 5A to 5C. FIG. 5A assumes a quantization coeffient set which consists of total sixteen coefficients, i.e., vertical four coefficients by horizontal four coefficients. The greatest absolute value of these coefficients is "13" or "1101" expressed in binary. Therefore, the absolute value of the coefficient is configured by four bit planes as shown in FIG. 5B. Every coefficient bit in each bit plane takes "0" or "1". On the other side, the only one negative value among the codes of the quantization coefficients is "−6", and every one of other values takes "0" or a positive value. Therefore, the bit plane of the code is expressed as shown in FIG. 5C.

The EBCOT is an means which encodes an image while measuring sample static of coefficient bits in the block for every block having a predetermined size. Quantization coefficients are subjected to entropy encoding in units of code blocks. Code blocks are encoded in a direction from the most significant bit (MSB) to the least significant bit (LSB), independently for every bit plane. The vertical and horizontal sizes of each code block belong to powers of 2 from 4 to 256. In general, sizes of 32×32, 64×64, 128×32, or the like are used. The quantization coefficients each are expressed as a number in binary with an n-bit code, and respectively express bits from the least significant bit (LSB) to the most significant bit (MSB), corresponding to bit $0$ to bit $t(n-2)$. The remaining 1 bit is a code. Encoding of code blocks is carried out with use of three kinds of encoding pass (a) to (c), as described below, in order from the side of the bit plane in the most significant bit (MSB).

Figure 6:
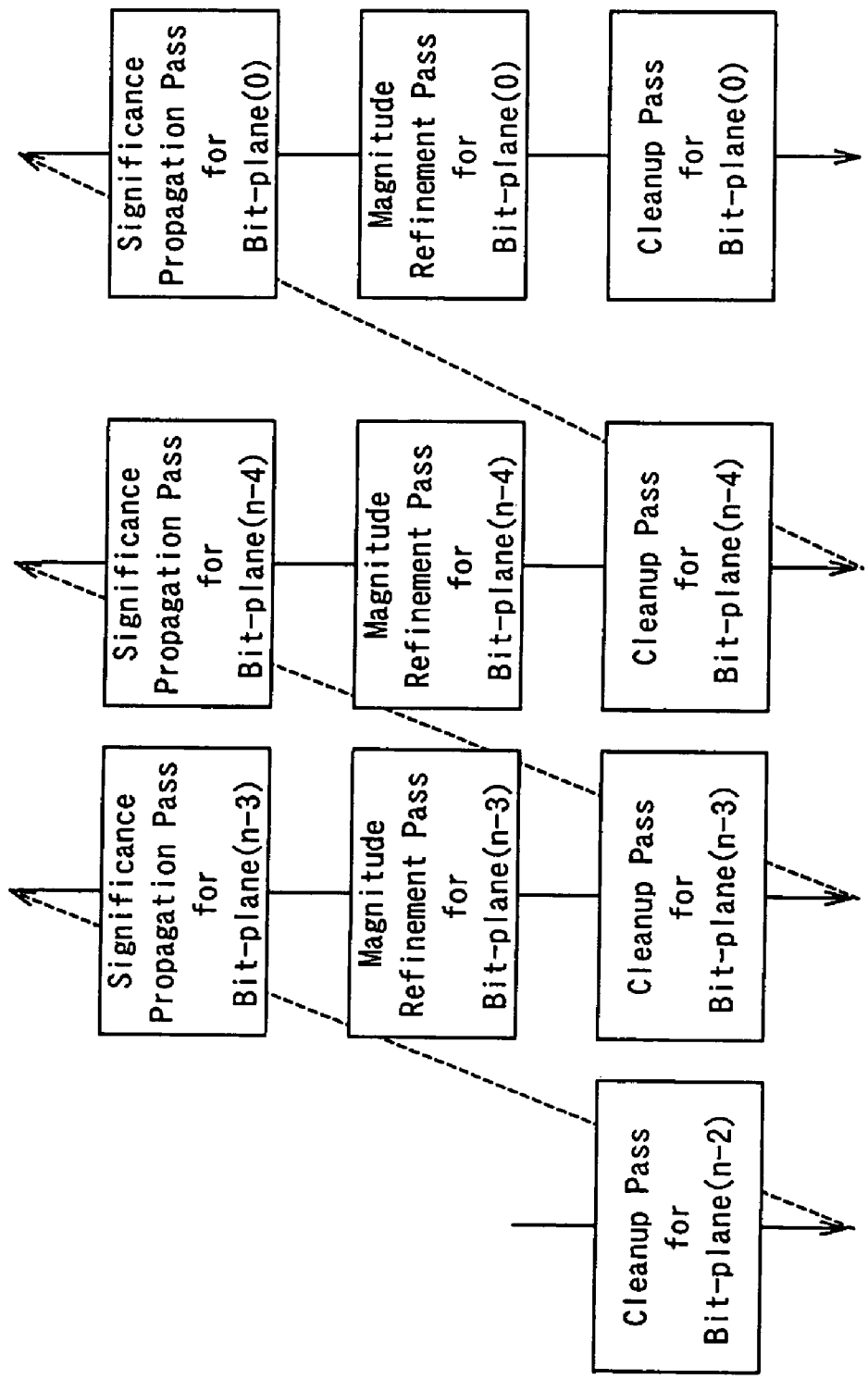
FIG. 6 is a chart showing a processing procedure of coding passes in a code block.

(a) Significance Propagation Pass
(b) Magnitude Refinement Pass
(c) Clean Up Pass FIG. 6 shows the order in which the three passes are used. As shown in FIG. 6, the bit plane $(n-2)$ (MSB) is encoded first with the Clean Up Pass (hereinafter referred to as CU pass). Subsequently, descending to the least significant bit (LSB) side, each bit lane is encoded with the Significance Propagation Pass (hereinafter referred to as SP pass), the Magnitude Refinement Pass (hereinafter referred to as MR pass), and the CU pass used in this order.

In actual cases, however, there is a description in the header, writing that "1" appears for the first time in what number bit plane from the most significant bit (MSB). Bit planes each consisting only of coefficients of zeros (zero bit planes) are not encoded. In the EBCOT, encoding is performed by repeatedly using the three kinds of encoding pass in the order described above.

Figure 7:
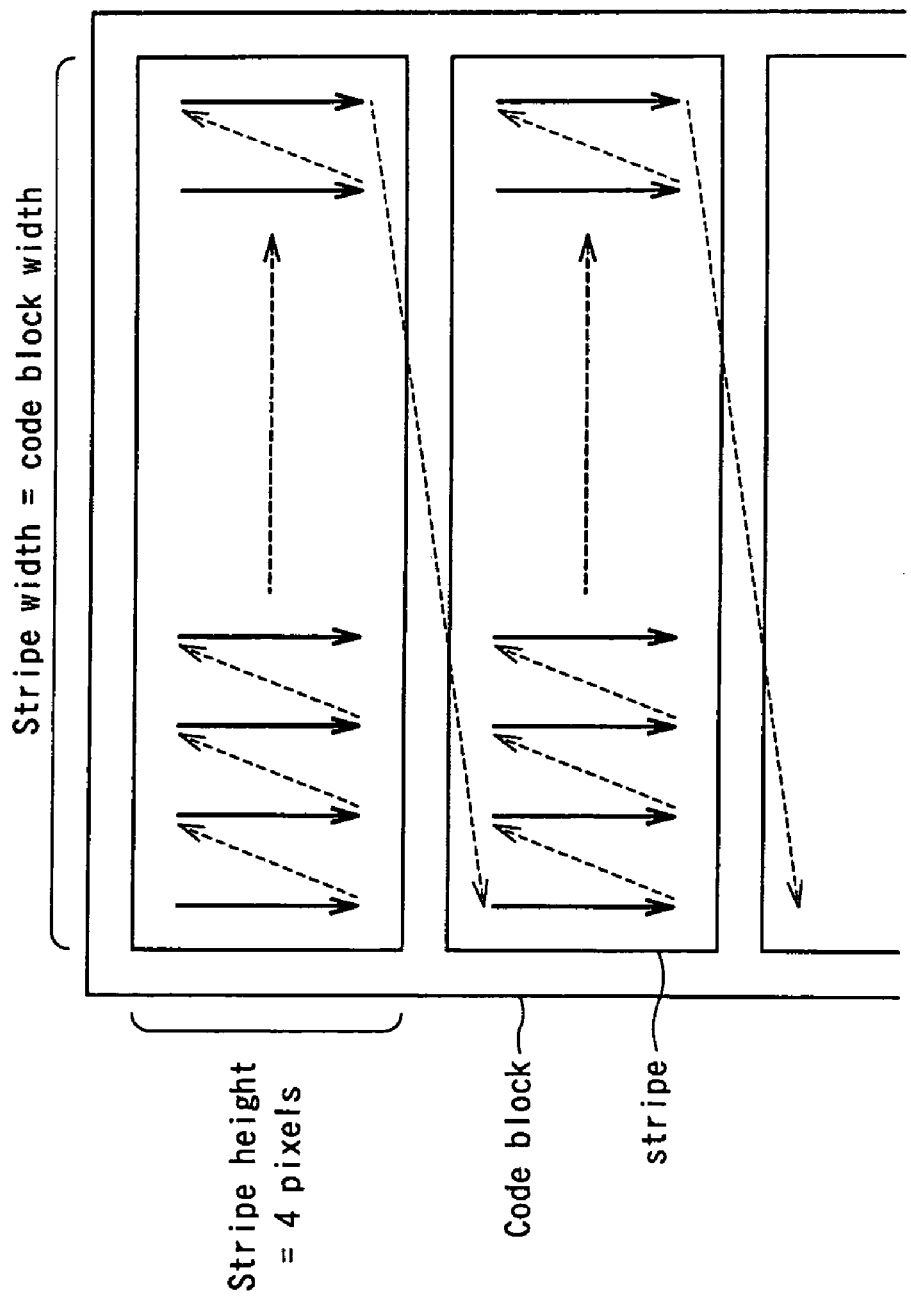
FIG. 7 is a diagram for explaining scanning order of coefficients in a code block.

Scanning of coefficient bits will now be described with reference to FIG. 7. Each code block is divided into stripes for every four bits in height. The stripes have a width equal to the width of the code block. A scanning order is the order in which all coefficient bits in one code block are traced. In one code block, scanning is performed in the order from an uppermost stripe to a lower stripe. In each stripe, scanning is performed in the order from a left column to a right column. In each column, scanning is performed in the descending order. For each of the encoding passes, all coefficient bits in a code block are processed in the scanning order.

The three encoding passes described above will now be described. The foregoing document "ISO/IEC 15444-1, Information technology-JPEG 2000, Part 1: Core coding system" deals with each of the three encoding passes.

(a) Significance Propagation Pass

With the SP pass which encodes a bit plane, a non-significant coefficient bit as indicating that at least one coefficient bit near 8 is significant is arithmetically encoded. Subsequently, if the encoded coefficient bit has a value of "1", positive or negative of the code is arithmetically encoded.

The term of "significance" means a state which an encoder has with respect to each coefficient bit. The initial value of the "significance" is "0" expressing non-significance. The initial value varies to "1" expressing significance when "1" is encoded as a coefficient bit. Afterwards, "1" is maintained continuously. Therefore, the "significance" can also be a flag indicative of whether information concerning a valid figure number has already been encoded or not. If an SP pass is generated in a bit plane, no SP pass is generated following bit planes.

(b) Magnitude Refinement Pass

With the MR pass which encodes a bit plane, a significant coefficient bit which is not encoded with the SP pass which also encodes a bit plane is arithmetically encoded.

(c) Clean Up Pass

With the CU pass which encodes a bit plane, a non-significant coefficient bit which is not encoded with the SP pass which also encodes a bit plane is arithmetically encoded. If the encoded coefficient bit has a value of "1", positive or negative of the code is arithmetically encoded.

In the arithmetic encoding with use of the above three encoding passes, ZC (Zero Coding), RLC (Run-Length Coding), SC (Sign Coding), and MR (Magnitude Refinement) are selectively used depending on cases, and thus, context of coefficients is selected. Further, symbols of coefficient bits and the selected context are encoded with use of arithmetic codes called MQ coding. This MQ coding uses binary arithmetic codes defined according to the JBIG2. For example, a document "ISO/IEC FDIS 14492: Lossy/Lossless Coding of Bi-level images, March 2000" describes the MQ coding. According to the JPEG 2000 standard, there are total 19 kinds of context for all coding passes.

As described above, the bit modeling section 16 explodes the quantization coefficients D14 onto bit planes, for every code block, and processes coefficient bits with three coding passes, for every bit plane, thus to generate a symbol and a context D15 for every coefficient bit. Further, the arithmetic encoding section 17 arithmetically encodes the symbol and context D15 for every coefficient bit, and supplies an arithmetic code D16 to the rate control section 18.

The rate control section 18 discards bit planes or coding passes from the least significant bit (LSB) side or selects bit planes or coding passes from the most significant bit (MSB) side, in order that the total code amount should reach a target code amount and the image quality after decoding should be optimal. As a result, unnecessary bit planes or coding passes are discarded, thereby achieving rate control. The rate control section 18 supplies an arithmetic code string D17 resulting from the rate control to the format section 19.

This rate control is carried out only when the first quantization section 13a is selected in the quantization section 13. Otherwise, if the second quantization section 13b is selected in the quantization section 13, the rate control section 18 is bypassed, and the arithmetic code D16 is directly supplied to the format section 19. A further description in this respect will be made later.

The format section 19 attaches various headers to the arithmetic code string D17 supplied from the rate control section 18 or the arithmetic code D16 supplied from the arithmetic encoding section 17, thereby to format the string or the code in compliance with the JPEG 2000 standard. Then, the format section 19 outputs the formatted string or code as an encoded stream D18.

By thus utilizing wavelet transformation, quantization, and entropy encoding, the image encoder 10 according to the present embodiment is capable of compressing/encoding an input image with high efficiency and outputting the image in form of an encoded code stream.

(2) Applicable Part in an Image Encoder

Meanwhile, as described above, the quantization section 13 includes the first quantization section 13a selected when normal image quality is required, and the second quantization section 13b selected when high image quality is required.

The first quantization section 13a performs quantization corresponding to the quantization size Δ, on the wavelet transformation coefficient set D12 supplied from the wavelet transformation section 12.

The quantization step size Δ is given by the following expression (1) as the E. 3 expression defined in the spec sheets of the JPEG 2000 standard. In this expression (1), $\Delta_b$ indicates a quantization step size assigned to a sub-band b, and Rb indicates a dynamic range also assigned to the sub-band b. $\epsilon b$ indicates a quantization exponent assigned also to the sub-band b, and $\mu_b$ indicates a quantization mantissa assigned also to the sub-band b.

$$\Delta_b = 2^{Rb-\epsilon b}(1+\mu_b/2^{11}) \quad (1)$$

The first quantization section 13a uses the quantization step size $\Delta_b$ obtained from the above expression (1), to calculate a quantization coefficient $q_b$ (u, v) according to the expression (2) below. In the expression (2), $dwt_b$ (u, v) indicates a wavelet transformation coefficient at the point expressed by (u, v). If the sign (x) takes x where x is positive as well as −x where x is negative. The floor (x) expresses a round-down processing for the integer value of x, e.g., floor (2.5)=2.

$$q_b(u, v) = \text{sign}(dwt_b(u, v)) \times \text{floor}(|dwt_b(u, v)|/\Delta_b) \quad (2)$$

Figure 8:
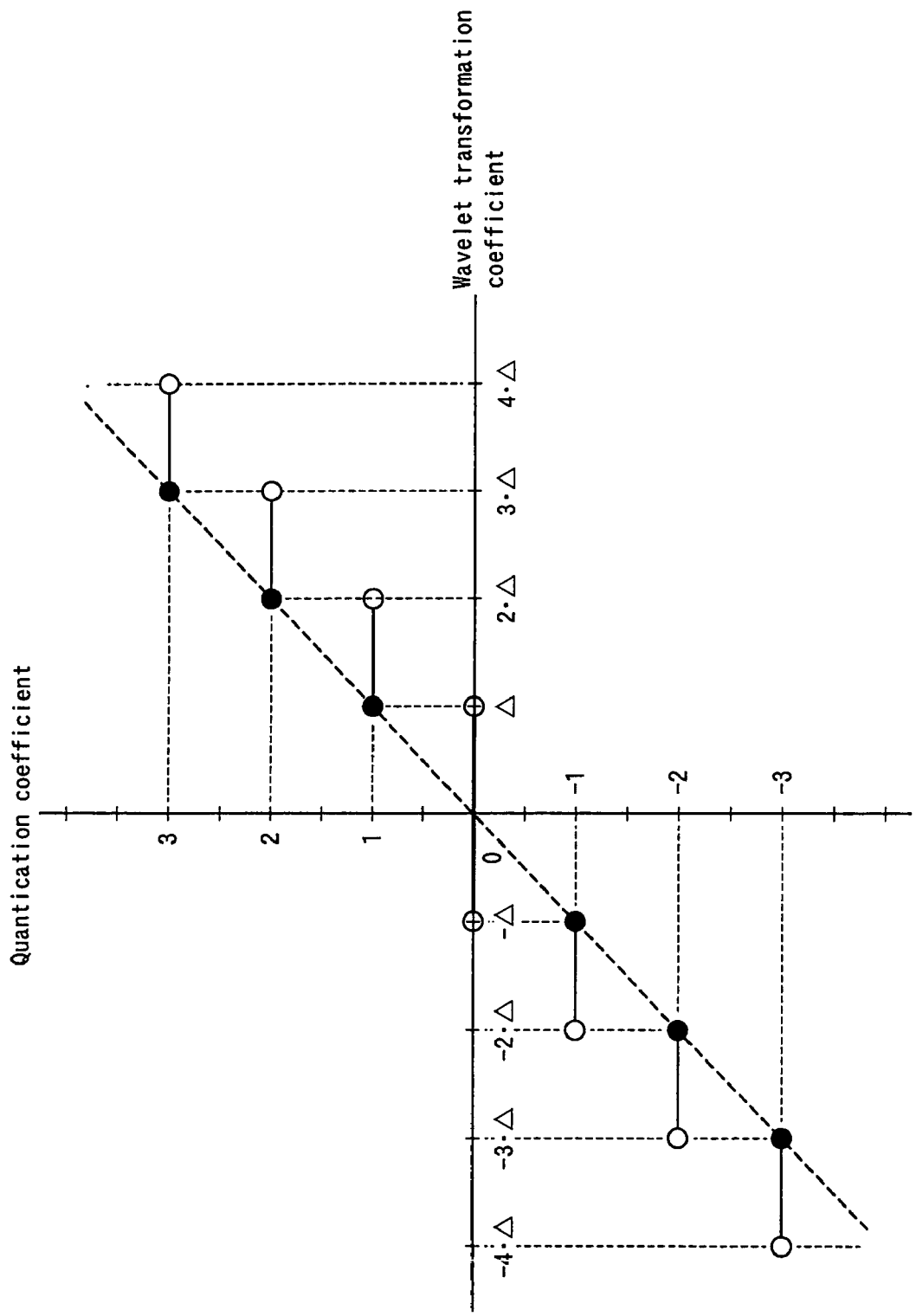
FIG. 8 is a graph showing a quantization characteristic of a first quantization section in the image encoder.

FIG. 8 shows the quantization characteristic of the first quantization section 13a where the ordinate axis represents the wavelet transformation coefficient as well as the abscissa axis represents the quantization coefficient. As can be seen from FIG. 8, when the wavelet transformation coefficient $dwt_b$(u, v) is within a range of −Δ to +Δ, the quantization coefficient $q_b$(u, v) is 0. Thus, the quantization zone in which the quantization coefficient $q_b$(u, v) is 0 is called a dead zone. According to the JPEG 2000 standard, a dead zone of this kind is provided mainly for the purpose of improving the compression rate. That is, at a high compression rate, the quantization step size Δ is so large that the wavelet transformation coefficient $dwt_b$(u, v) falls in the dead zone shown in FIG. 8 with high possibility. Therefore, the quantization coefficient $q_b$(u, v) becomes 0 at a high percentage, and as a result, the compression rate in the entropy encoding can be improved.

After the quantization coefficient set D13 is thus obtained by the first quantization section 13a, processings as described above are executed by the code blocking section 14, bit modeling section 16, and the arithmetic encoding section 17, thereby to obtain an arithmetic code D16.

Thereafter, the rate control section 18 discards bit planes or coding passes from the least significant bit (LSB) side or selects bit planes or coding passes from the most significant bit (MSB) side, as described above, in order that the total code amount should reach a target code amount and the image quality after decoding should be optimal. As a result, unnecessary bit planes or coding passes are discarded, thus achieving rate control. The discarding of n bit planes in the rate control section 18 is equivalent to division of the quantization coefficient set by n-th power of 2. Therefore, if TBc (pieces of) bit planes are discarded from a code block, the quantization step size Δ as a result of rate control is given by the following expression (3).

$$\Delta_c = \Delta_b \times 2^{TBc} \quad (3)$$

Hence, the quantization coefficient $q_b$(u, v) as a result of rate control is obtained from the following expression (4).

$$q_b(u, v) = \text{sign}(dwt_b(u, v)) \times \text{floor}(|dwt_b(u, v)|/\Delta_c) \quad (4)$$

On the other side, the second quantization section 13b uses the quantization step size $\Delta_b$ obtained by the expression (1) above, to calculate the quantization coefficient $q_b$(u, v) according to the expression (5) below.

$$q_b(u, v) = \text{sign}(dwt_b(u, v)) \times \text{floor}(|dwt_b(u, v)|/\Delta_b + 0.5) \quad (5)$$

As shown by this expression (5), in the quantization performed by the second quantization section 13b, the absolute value of the wavelet transformation coefficient $dwt_b(u, v)$ is divided by the quantization step size $\Delta_b$ and is thereafter added with 0.5. In the quantization achieved by this expression, a rounding processing is executed and the quantization characteristic thereof will be as shown in FIG. 9.

Figure 9:
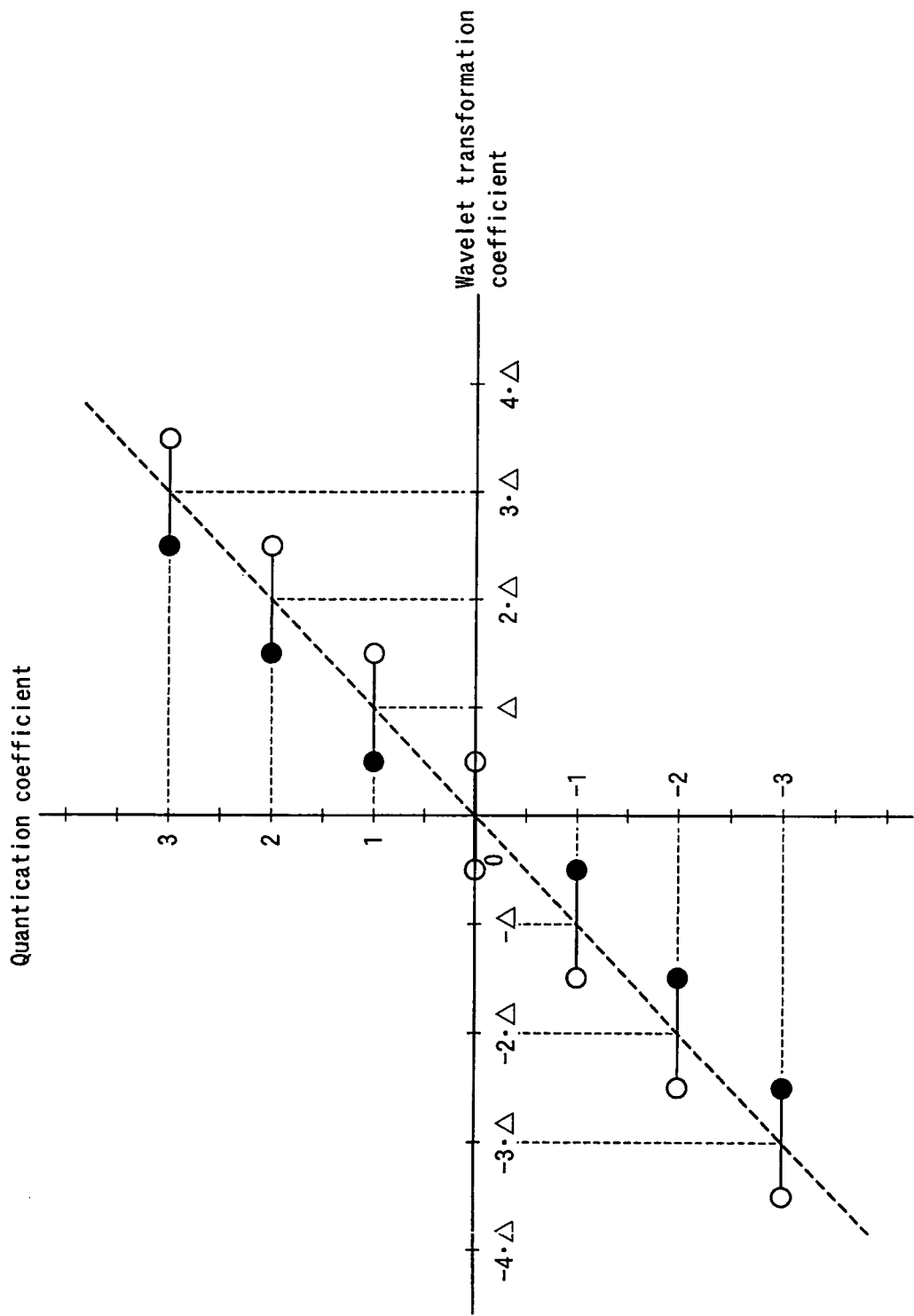
FIG. 9 is a graph showing a quantization characteristic of a second quantization section in the image encoder.

As is apparent from comparison between FIGS. 8 and 9, in the quantization in the second quantization section 13b as shown in FIG. 9, the width of the dead zone is narrower than that in the first quantization section 13a shown in FIG. 8. As a result of this, the quantization coefficient $q_b(u, v)$ takes 0 at a lower rate, and accordingly, higher image quality can be achieved.

After the quantization coefficient set D13 is thus obtained by the second quantization section 13b, processings as described previously are executed by the code blocking section 14, bit modeling section 16, and arithmetic encoding section 17, thereby to obtain an arithmetic code D16.

Suppose that rate control is carried out by the rate control section 18 and n (pieces of) bit planes are discarded from the least significant bit (LSB) side. This rate control is a processing equivalent to division of the quantization coefficient set by n-th power of 2. In other words, this processing is equivalent to quantization with a wider dead zone as shown in FIG. 8. In the present embodiment, if quantization is carried out by the second quantization section 13b, the rate control section 18 is bypassed in order to maintain high image quality. At this time, the total code amount may disagree with the target code amount. However, the total code amount can be substantially adjusted to the target code amount by performing quantization with an optimal quantization step size $\Delta_b$.

Then, the format section 19 adds various headers to the arithmetic code string D17 supplied from the rate control section 18 or the arithmetic code D16 supplied from the arithmetic encoding section 17, thereby to generate an encoded stream D18. At this time, the format section 19 makes the quantization step size ($\Delta b$ or $\Delta c$) included in the headers.

Also, a predetermined parameter for determining a parameter r ($0 \leq r < 1$) used in inverse quantization is included in the headers by the format section 19.

According to JPEG 2000 standard, a plurality of marker segments are prepared for purposes in the header, and QCD and QCC marker segments are prepared for quantization. FIG. 10 shows a table concerning Sqcd and Sqcc parameters existing in the QCD and QCC marker segments. This table is disclosed as "Table A-28" in the spec sheets of the JPEG 2000 standard. In FIG. 10, undefined columns are reserved for the future. As shown in FIG. 11, the format section 19 utilizes free three bits to describe values of 0 to 7 as the predetermined parameter. For example, the parameter r is expressed in eight ways of 0, ⅛, 2/8, . . . ⅞. If quantization is carried out by the second quantization section 13b, the parameter r is 0, and therefore, only 0 is used as the predetermined parameter. A detailed description will be made later in this respect.

As described above, the quantization section 13 in the present embodiment is capable of varying the image quality of a decoded image by varying the width of the dead zone and by including the predetermined parameter for inverse quantization in the encoded code stream D18. Particularly when high quality is required, the width of the dead zone is narrowed to eliminate loss of details caused by quantization, and hence, subjective image quality can be improved.

In addition, the present embodiment complies with the Part-1 standard according to the JPEG 2000 scheme. Therefore, a decoded image of minimum necessary quality can be obtained even when a conventional general-purpose image decoder is used in place of an image decoder corresponding to the above image encoder 10.

(2-2) Modifications

Figure 12:
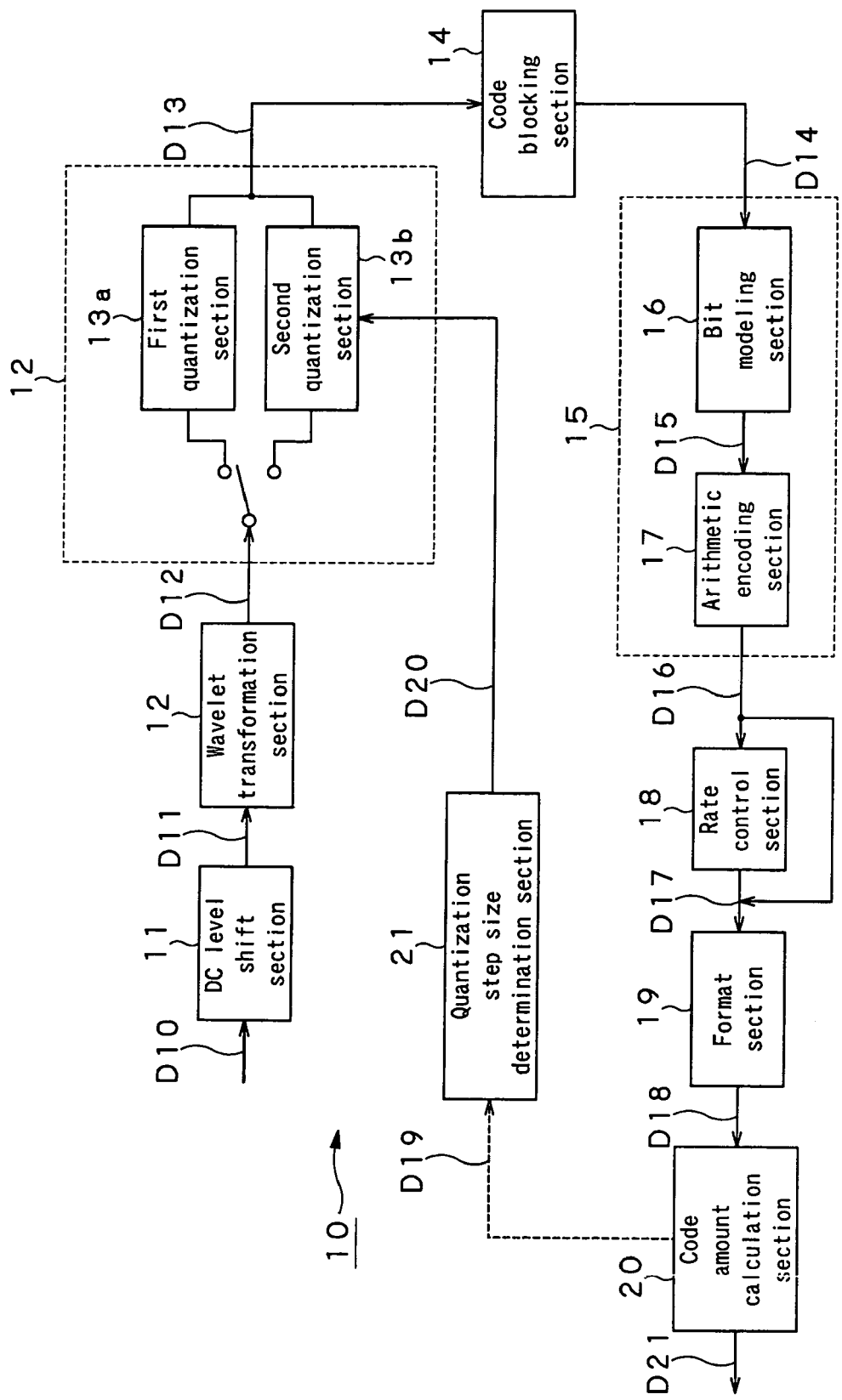
FIG. 12 is a diagram showing a schematic configuration of an image encoder for adjusting a total code amount to a target code amount when quantization is performed by the second quantization section 13b.

According to the present embodiment, an encoded code stream D18 is generated by bypassing the rate control section 18 if the second quantization section 13b carries out quantization, as described above. In this case, it is not always easy to adjust the total code amount to the target code amount. Hence, for example, a code amount calculation section 20 and a quantization step size determination section 21 may further be provided, as shown in FIG. 12. Encoding may be performed with several different quantization step sizes, and a quantization step size fit for the target code amount may then be selected.

More specifically, the code amount calculation section 20 obtains the code amount of an encoded code stream D18 outputted from the format section 19. If the difference between the obtained code amount and the target code amount is not smaller than a threshold value, the code amount calculation section 20 sends a control signal D19 to the quantization step size determination section 21. The quantization step size determination section 21 updates the quantization step size in accordance with the control signal D19, and then supplies a new updated quantization step size D20 to the second quantization section 13b. The second quantization section 13b performs quantization with use of the quantization step size D20. Otherwise, if the difference between the code amount of the encoded code stream D18 and the target code amount is smaller than the threshold value, the code amount calculation section 20 outputs directly the code stream as an encoded code stream D21.

Thus, the total code amount can be adjusted to the target code amount even if quantization is carried out by the second quantization section 13b and the rate control section 18 is bypassed.

(3) Configuration and Operation of the Image Decoder

Figure 13:
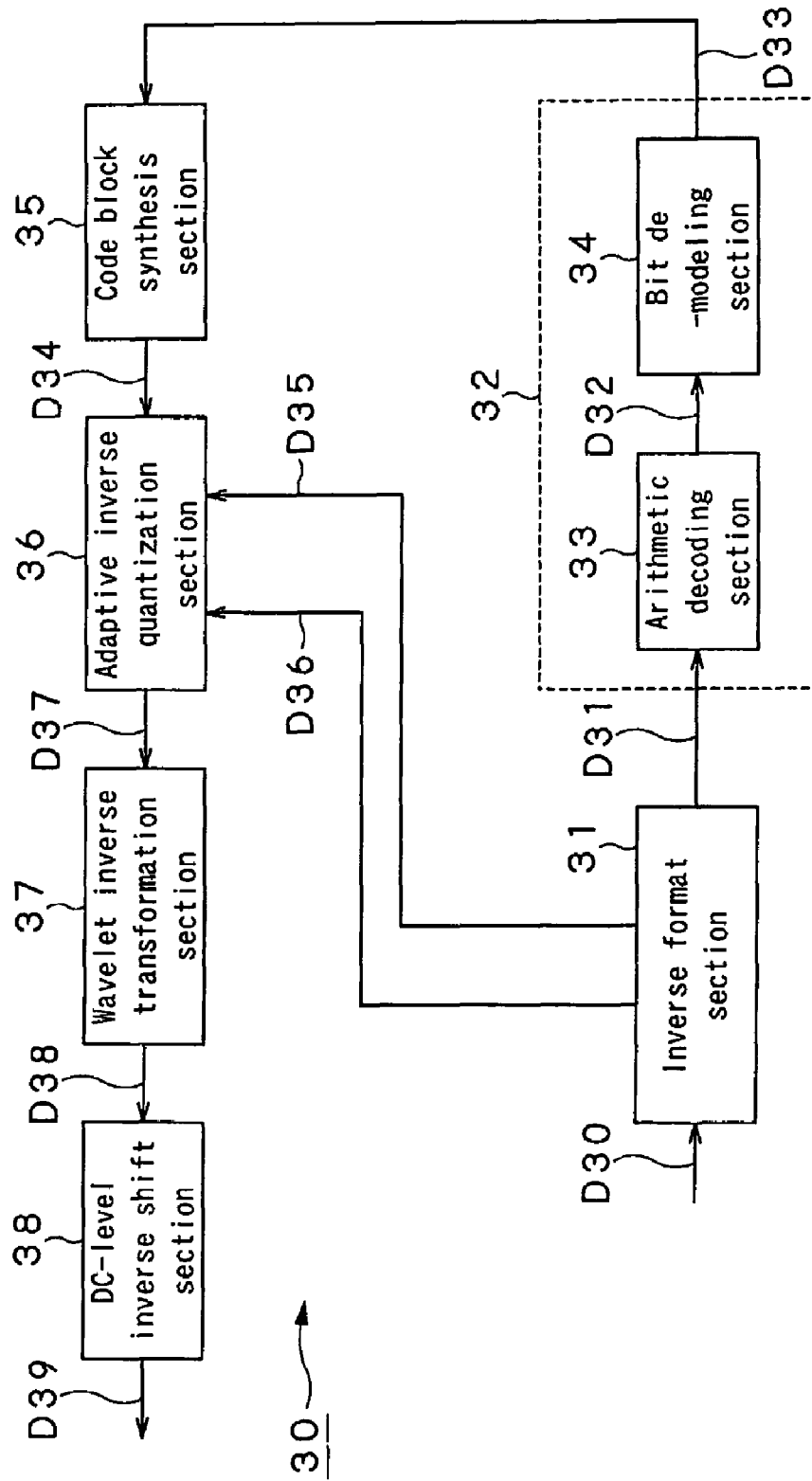
FIG. 13 is a diagram for explaining a schematic configuration of an image decoder according to the embodiment.

FIG. 13 shows a schematic configuration of the image decoder according to the present embodiment. As shown in FIG. 13, the image decoder 30 is constituted by an inverse format section 31, arithmetic decoding section 33, bit de-modeling section 34, code block synthesis section 35, adaptive inverse quantization section 36, wavelet inverse transformation section 37, and DC-level inverse shift section 38. The arithmetic decoding section 33 and the bit de-modeling section 34 together constitutes an EBCOT decoding section 32.

The inverse format section 31 is inputted with an encoded code stream D30 and decomposes this stream into various encoded information. The inverse format section 31 then supplies the arithmetic decoder 33 forming part of the EBCOT section 32 with an arithmetic code string D31 for every block. Also, the inverse format section 31 supplies the adaptive inverse quantization section 36 with a quantization step size ($\Delta_b$ or $\Delta_c$) D35 in a header, and with a predetermined parameter D36 in QCD and QCC marker segments also in the header.

The arithmetic decoding section 33 arithmetically decodes the arithmetic code string D31 to generate a symbol and a context D32 for every coefficient bit. The bit de-modeling section 34 reconstructs binary data in units of bit planes from the symbol and context D32 for every coefficient bit. In actual cases, the binary data is a quantization coefficient set D33. The bit de-modeling section 34 supplies the quantization coefficient set D33 to the code block synthesis section 35.

The code block synthesis section 35 synthesizes the quantization coefficient set D33 for every code block, to generate a quantization coefficient set D34 for every sub-band, and supplies the adaptive inverse quantization section 36 with the quantization coefficient set D34 for every sub-band.

The adaptive inverse quantization section 36 inversely quantizes the quantization coefficient set D34 for every sub-band, which is supplied from the code block synthesis section 35, to transform the coefficient set D34 into a wavelet transformation coefficient set D37. The adaptive inverse quantization section 36 supplies the wavelet transformation coefficient set D37 to the wavelet inverse-transformation section 37.

More specifically, when an inverse quantization processing corresponding to the first quantization section 13a is performed, the adaptive inverse quantization section 36 uses $\Delta_c$ as a quantization step size D35 supplied from the inverse format section 31 and a parameter r obtained from the predetermined parameter D36, to obtain a wavelet transformation coefficient Rq(u, v) after inverse quantization, according to the expression (6) below.

$$Rq(u, v)=(q(u, v)+r)\times\Delta_c \quad (6)$$

In this expression (6), $\Delta_c$ is a final quantization step size as a result of rate control, as described above. Normally, 0.5 is used as the parameter r.

On the other side, when an inverse quantization processing corresponding to the second quantization section 13b is performed, the adaptive inverse quantization section 36 uses $\Delta_b$ as a quantization step size D35 supplied from the inverse format section 31 and a parameter r obtained from the predetermined parameter D36, to obtain a wavelet transformation coefficient Rq(u, v) after inverse quantization, according to the expression (7) below.

$$Rq(u, v)=(q(u, v)+r)\times\Delta_b \quad (7)$$

If the inverse quantization processing corresponding to the second quantization section 13b is thus performed, the parameter r is 0. Therefore, in actual cases, the adaptive inverse quantization section 36 obtains the wavelet transformation coefficient Rq(u, v) after inverse quantization, according to the expression (8) below.

$$Rq(u, v)=q(u, v)\times\Delta_b \quad (8)$$

Figure 14:
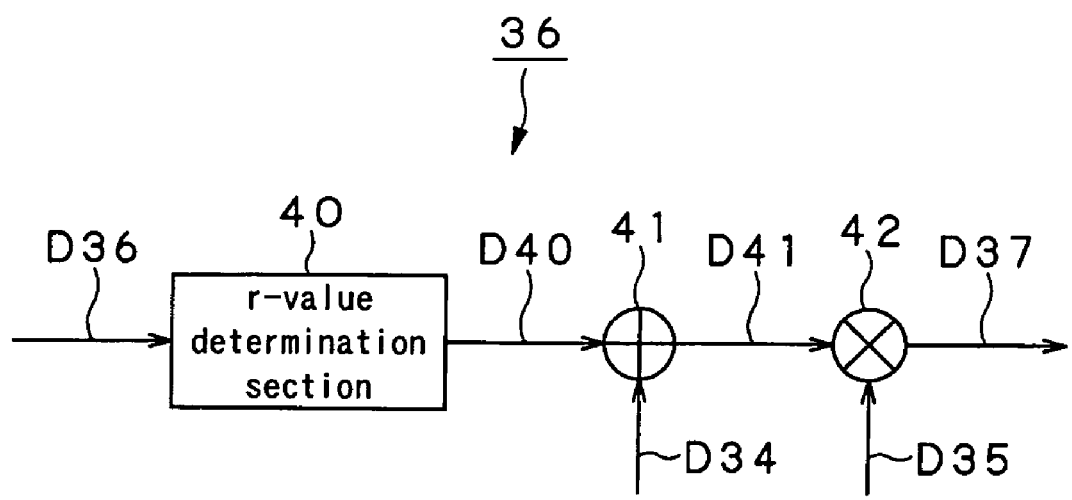
FIG. 14 is a diagram showing a schematic configuration of an adaptive inverse quantization section in the image decoder.

FIG. 14 shows a schematic configuration of the adaptive inverse quantization section 36. As shown in FIG. 14, the adaptive inverse quantization section 36 is constituted by a r-value determination section 40, adder 41, and multiplier 42. The r-value determination section 40 determines a parameter D40 indicating r on the basis of the predetermined parameter D36 supplied from the inverse format section 31 and supplies the adder 41 with the parameter D40. More specifically, if the predetermined parameter D36 is x, the r-value determination section 40 takes x/8 as the parameter r. The adder 41 adds up the parameter D40 and the quantization coefficient set D34 for every frame, which is supplied from the code block synthesis section 35. The adder 41 supplies the addition result as addition value D41 to the multiplier 42. The multiplier 42 multiplies the addition value D41 by the quantization step size D35, to obtain a wavelet transformation coefficient set D37, and supplies the coefficient set D37 to the wavelet inverse transformation section 37.

The wavelet inverse transformation section 37 inversely transforms the wavelet transformation coefficient set D37, to generate a decoded image D38, and supplies the decoded image D38 to the DC-level inverse shift section 38.

The DC-level inverse shift section 38 performs an inverse shift processing on the decoded image D38 if a DC-level shift processing has been effected by the image encoder 10. The DC-level inverse shift section 38 then outputs a final decoded image D39.

As described above, in the image decoder 30 according to the present embodiment, inverse quantization is performed with use of a predetermined parameter D36 included in the encoded code stream D30. Therefore, it is possible to obtain a decoded image having image quality corresponding to the width of the dead zone at the time when quantization was carried out.

The present invention is not limited to the embodiment described above but various modifications are possible without deviating from the spirit of the present invention.

For example, the embodiment described above has been described as using x/8 as the parameter r if the predetermined parameter D36 written in the QCD and QCC maker segments in the header is x. The present invention is not limited to this case. That is, a table for the parameter r may be prepared in the r-value determination section 40, and the predetermined parameter D36 may express an index to this table.

What is claimed is:

1. An image decoder comprising:
   inverse format means which decomposes the encoded code stream into at least an arithmetic code and a predetermined parameter, the encoded code stream having been generated by hierarchically performing a filtering process on an input image to generate a plurality of sub-bands, quantizing, with a quantization means, coefficients in each sub-band, dividing the sub-bands, to generate a plurality of code blocks each having a predetermined size, generating, for each code block, bit planes from a most significant bit to a least significant bit, generating the arithmetic code by arithmetically encoding a coding pass generated for each bit plane; and adding, with a format means, a header to the arithmetic code to generate an encoded code stream, wherein the quantization means sets, in response only to a selected image quality level, a corresponding width of a dead zone, the dead zone being a quantization zone where the coefficients are quantized to a value of 0, and the format means sets the predetermined parameter included in the header;
   decoding means which decodes the arithmetic code;
   encoded-pass decoding means which reconstructs the bit planes from the most significant bit to the least significant bit by decoding the encoded coding pass for each bit plane;
   code block reconstruction means which reconstructs the code blocks, based on the bit planes from the most significant bit to the least significant bit;
   sub-band generation means which collects the code blocks to generate the sub-bands;
   inverse quantization means which inversely quantizes a plurality of quantization coefficients for each sub-band, with use of the predetermined parameter; and
   filtering means which hierarchically performs a filtering process on the sub-bands, to reconstruct the input image, wherein
   the inverse quantization means adds the predetermined parameter to each of the quantization coefficients for every one of the sub-bands, and multiplies each of the addition results thereof by a quantization step size, to inversely quantize the quantization coefficients for each sub-band.

2. The image decoder according to claim 1, wherein in the quantization, a first quantization processing in which the width of the dead zone is relatively wide or a second quantization processing in which the width of the dead zone is relatively narrow can be selected in correspondence with the required image quality, in the first quantization processing, each of the coefficients in each of the sub-bands is divided by a quantization step size assigned to the sub-band to which the coefficient being divided belongs, and thereafter, a fraction thereof is rounded down, in the second quantization processing, each of the coefficients in each of the sub-bands is divided by a quantization step size assigned to the sub-band to which the coefficient being divided belongs, and the dividing result is added with 0.5, and thereafter, a fraction thereof is rounded down, and the inverse quantization means adds r ($0 \leq r < 1$) as the predetermined parameter if the first quantization processing has been performed, or adds 0 as the predetermined parameter if the second quantization processing has been performed.

3. The image decoder according to claim 2, wherein the inverse quantization means adds 0.5 as the predetermined parameter if the first quantization processing has been performed.

* * * * *